United States Patent [19]

Behrens

[11] Patent Number: 4,828,459
[45] Date of Patent: May 9, 1989

[54] ANNULAR LINEAR INDUCTION PUMP WITH AN EXTERNALLY SUPPORTED DUCT

[75] Inventor: Hugh C. Behrens, Angleton, Tex.

[73] Assignee: The Dow Chemical Company, Midland, Mich.

[21] Appl. No.: 133,763

[22] Filed: Dec. 16, 1987

Related U.S. Application Data

[60] Continuation of Ser. No. 900,200, Aug. 25, 1986, abandoned, Division of Ser. No. 720,434, , abandoned.

[51] Int. Cl.⁴ .............................................. H02K 44/00
[52] U.S. Cl. ................................ 417/50; 106/DIG. 3; 252/378 R; 428/363
[58] Field of Search ..................... 417/50; 310/11; 106/DIG. 3; 252/378 R, 378 P; 428/363, 454

[56] References Cited

U.S. PATENT DOCUMENTS

| | | | |
|---|---|---|---|
| 1,123,985 | 1/1915 | Bolling | 106/DIG. 3 |
| 2,709,158 | 5/1955 | Bouchet | 252/378 R |
| 2,764,095 | 9/1956 | Baker | 417/50 |
| 2,810,425 | 10/1957 | Heyman | 428/363 |
| 2,863,721 | 12/1958 | Endicott et al. | 252/378 R |
| 2,977,193 | 3/1961 | Endicott et al. | 106/DIG. 3 |
| 3,226,286 | 12/1965 | Scheuer | 428/363 |
| 3,275,859 | 9/1966 | Meyerand, Jr. et al. | 417/50 |
| 4,107,358 | 8/1978 | Bayles et al. | 428/454 |
| 4,436,831 | 3/1984 | Nishizako et al. | 106/DIG. 3 |
| 4,533,581 | 8/1985 | Asaumi et al. | 428/363 |

FOREIGN PATENT DOCUMENTS

| | | | |
|---|---|---|---|
| 776127 | 1/1968 | Canada | 428/63 |
| 543214 | 2/1932 | Fed. Rep. of Germany | 417/50 |
| 782689 | 6/1979 | U.S.S.R. | 310/11 |
| 539708 | 9/1941 | United Kingdom | 106/DIG. 3 |

Primary Examiner—Donald E. Stout

[57] ABSTRACT

An annular electromagnetic induction pump is disclosed which operates without an external cooling source in pumping molten metals such as magnesium, aluminum, lead, zinc, antimony and their numerous alloys. Also disclosed is an electrical insulation material which is serviceable without degradation at temperatures up to 1500° F. Also disclosed is a six coil version of said annular electromagnetic induction pump which provides reduced size advantages.

3 Claims, 3 Drawing Sheets

SECTION – CONVENTIONAL 12-COIL PUMP

SECTION - PUMP ASSEMBLY

ANNULAR LINEAR INDUCTION PUMP WITH AN EXTERNALLY SUPPORTED DUCT

CROSS REFERENCE TO RELATED APPLICATIONS

This is a continuation of application Ser. No. 900,200, filed Aug. 25, 1986, now abandoned, which is a divisional of application Ser. No. 720,434, filed Apr. 5, 1985, now abandoned. The invention described herein is related to my copending U.S. Application Ser. No. 741,782, filed June 6, 1985, entitled "Molten Metal Handling System" now U.S. Pat. No. 4,635,706; Ser. No. 741,939, filed June 6, 1985, entitled "Flat Linear Flowmeter" and Ser. No. 743,442, filed June 11, 1985, entitled "Flowmeter" now U.S. Pat. No. 4,688,431.

BACKGROUND OF THE INVENTION

Electromagnetic pumps have been designed in which a single duct is oriented between the pole pieces of a magnet and current is induced in a conducting fluid within the duct. The induced current flow is perpendicular to the magnetic flux from the magnet. This reaction to the flux causes a force to be exerted on the fluid perpendicular to both the current and the flux so that pumping action takes place. Such pumps have no moving parts and are well suited for applications where leakage, such as the leakage encountered in conventional pumps, cannot be tolerated. Representative of such applications is the pumping of the liquid metal coolant in fast breeder reactors.

The fact that electromagnetic pumps can perform the function of a mechanical pump while having no bearings, no seals, no mechanical moving parts makes this type of pump extremely attractive in the movement of molten metals. While electromagnetic pumps have a relatively low efficiency (about 45%), which is little more than half the value obtainable from a corresponding mechanical pump, the use of electromagnetic pumps in a liquid metal movement, such as atomic reactors, is almost essential to the safe operation of such reactors and their associated elements.

There are various types of electromagnetic pumps such as, for example, helical magnetic pumps, flat linear induction pumps, centrifugal electromagnetic pumps and annular linear induction pumps. Each of the various types of electromagnetic pump has different configurations and preferred applications.

When pumps of the prior art are employed to pump molten metals which melt much above molten sodium, they have a tendency to short out and, as a result, the prior art pumps have resorted to cooling the magnetic coils with inert fluids. Such modifications have increased the size of the pump and necessitated sealing devices.

SUMMARY OF THE INVENTION

Annular linear induction pumps built according to the teaching of this invention have the ability to operate at temperatures in excess of 700° C. without external cooling and develop hydrostatic heads of molten metals such as molten magnesium in excess of 30 feet.

The crus of the pump built in accordance with the present invention is found in the insulation employed in the windings and stator, the selection of the stator electromagnetic material, the selection of the winding material and the selection of the central electromagnetic core material. While each material other than the insulation is known in the art and its characteristics are known, their use in the combination and, further, in combination with the novel insulating material produces a unique pump capable of operating in the high temperature range profile of molten magnesium for example. While significant disclosure hereinafter will make particular reference to magnesium, it is to be understood that other metals such as zinc, aluminum and their alloys are pumpable using the pump of the present invention.

The insulation which allows the high temperature operation of the pump of the present invention is an especially treated mica which, after treatment, does not fail at the temperature to which it is subjected to during operation of the pump.

The metal composition of the magnetic core and the stator elements is a cobalt iron alloy and, in the case of pumping magnesium, the central tube and exterior are made of a columbian stabilized nickel alloy stainless steel. In those cases where it is undesirable to expose the magnesium to any nickel it is preferred to employ a chromium molybdium containing steel such as AISI type 430 stainless steel.

In addition, the preferred design of the pump employs only six coils versus the twelve or more coils used in today's pumps.

BRIEF DESCRIPTION OF THE INVENTION

Figure 1:
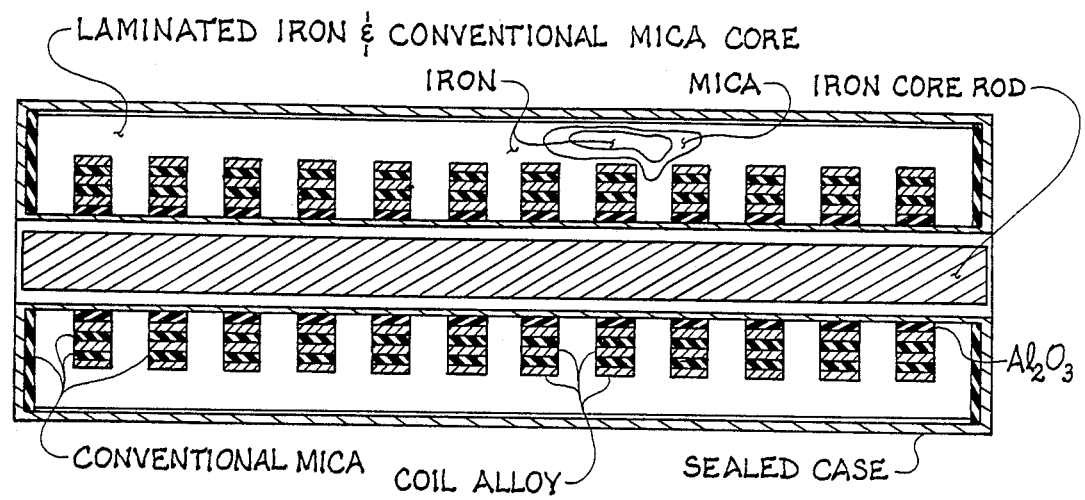
FIG. 1 represents a side cutaway view of a conventional 12 coil pump.

The pump of the present invention utilizes the essential electrical configurations and elements of existing pumps. The materials of construction and design are modified by (1) replacing the electrical insulation materials with a specially treated mica which has been substantially freed of impurities, which were found to be released at high temperatures, e.g. above about 1300° F. (Ca 700° C.); (2) replacing the Invar windings normally used with deoxygenated copper; (3) replacing the conventional carbon steel core rod with a cobalt alloy steel; and (4) reducing the number of windings to six. Further, in the case of pumping magnesium metal, the external metal housing components in contact with the molten magnesium are replaced with 347 stainless steel which is a columbian stabilized nickel alloy or 430 SS which is a chromium molybdium containing steel.

In the case of the mica, it was discovered that conventional electrical grade mica, when subjected to the high temperatures encountered in pumping magnesium, released impurities of unknown identification. Conventional mica sheets produced for electrical insulation and which have not been treated as hereinafter described released impurities beginning at temperatures above about 400° C. the residue from which were found to be the primary cause of the shorting of the windings and-/or laminated cores.

It has now been found that if conventional commercially available mica, for example in sheet form, the usual form of mica employed to insulate transformer, laminations as well as electrical resistance applications, is heated to above about 700° C. and preferably above about 850° C. under an oxidizing atmosphere, e.g. air, for a period in excess of eight hours, the so treated mica will withstand the rigors of high temperature (above 1300° F., Ca 700° C.) use without producing a shorting condition. Conventional mica used as a laminate insulation and the coil winding insulation even when padded with argon when placed in magnesium service resulted in a black soot forming on the mica surface, whereas mica which had been treated in accordance with the present invention, e.g. heating under the oxygen atmosphere, and at least to the use temperature until substantially free of sooty formation visible when heated to 500° C. (932° F.) in the presence of an argon atmosphere, and employed in an argon padded atmosphere showed no visible evidence of such sooty formation. In every instance where untreated mica was employed as the insulation in a pump used in magnesium service shorting of the coils occurred, in many instances on pre-use tests and/or shortly after immersion into the molten material.

With respect to the replacement of the components of present day pumps with, for example a cobalt alloy elements, the choice is made because the Curie point is not exceeded at operating temperatures in the range up to 1500° F. Further, replacement of the 430 SS with columbian stabilized nickel steel (347 SS) gives higher temperature strength characteristics so that the interior of the pump can be padded with an inert gas such as argon or helium, during construction and sealed.

It is also to be understood that if an external source of the pad gas is permissible in the operating environment, then either material (430 or 347 SS) can be employed with but a positive pad gas pressure being applied eliminating the necessity for the stronger metals to withstand the pressure built up by the sealed gas on heating to the pump molten metal operating temperature.

DETAILED DESCRIPTION OF INVENTION

In a representative example a conventional twelve coil pump manufactured by MHD Pump and Generators of Richland, Wash. such as illustrated in FIG. 1, in cutaway view, was introduced into a magnesium production cell. In order to accomodate the twelve coil pump it had to be laid on its side with an outlet pipe having a right angle bend or right angle elbow installed. This pump failed almost immediately upon being placed in service. Upon disassembly the pump was found to have a sooty deposit on the internals. Therefore, all stator windings were removed and the stator laminate disassembled. All surfaces were cleaned of visible deposits. The elements were reassembled using amber mica supplied by Midwest Mica & Insulation Company under code 11-08-01. The laminate was reassembled and the stator rewound using 11-08-01 amber mica strips to separate the laminate and windings. On operation of the re-assembled pump under heat stress test conditions, a short circuit was noted; the pump was opened and the visual inspection showed the deposits had reappeared. The stator laminate and windings were again cleaned and reassembled this time with amber mica 11-08-01 which had been heated at about 850° C. in an oxidizing atmosphere (air) sweep for 16 hours. The reassembled pump passed the heat stress test and was placed in magnesium casting service. The pump failed in time due to the copper leads becoming embrittled, presumably due to hydrogen embrittlement. The copper leads were replaced with nickel, the coils were replaced with deoxygenated copper (CDA 102), the core rod was replaced with cobalt steel alloy and the heated mica utilized throughout.

The pump of the present invention is illustrated in the drawings, FIGS. 2-5.

Figure 2:
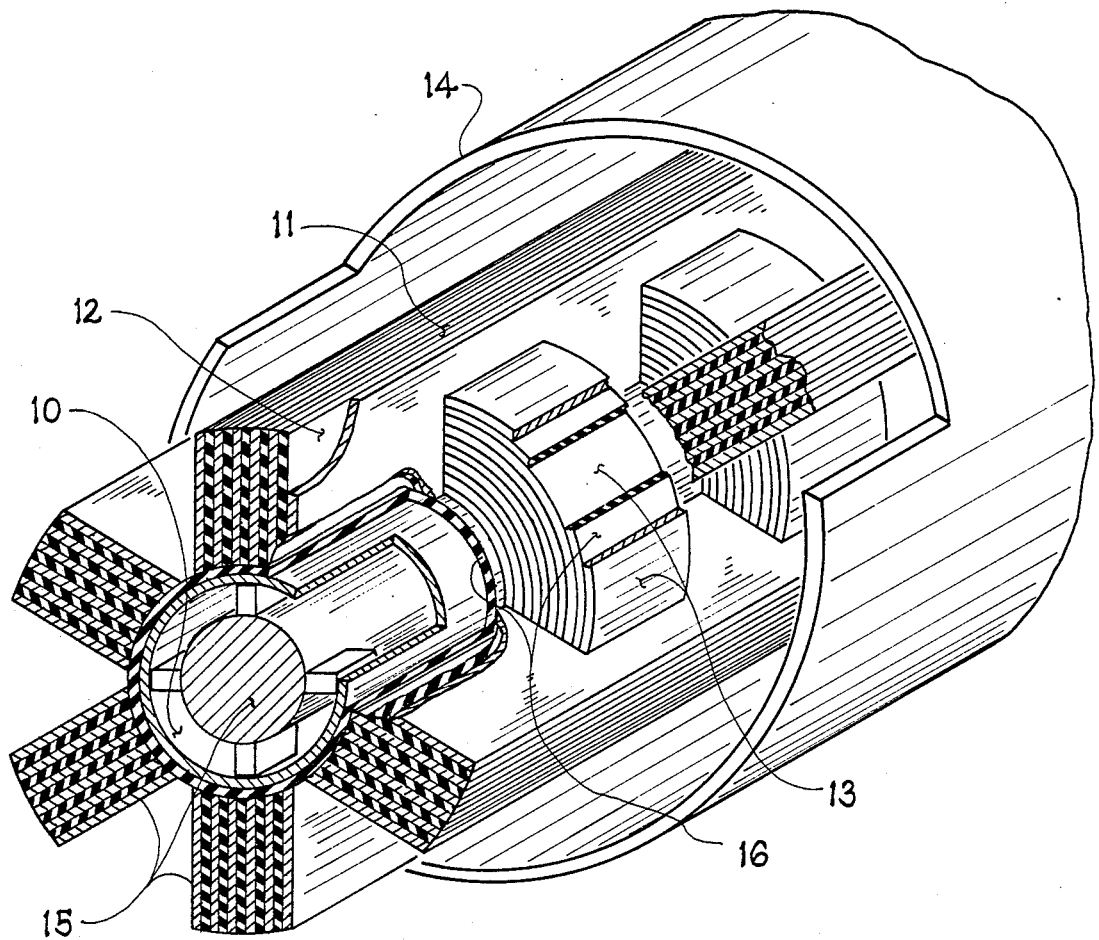
FIG. 2 represents in partial cutaway isometric the interior of a pump showing the embodiment of the present invention.
Figure 3:
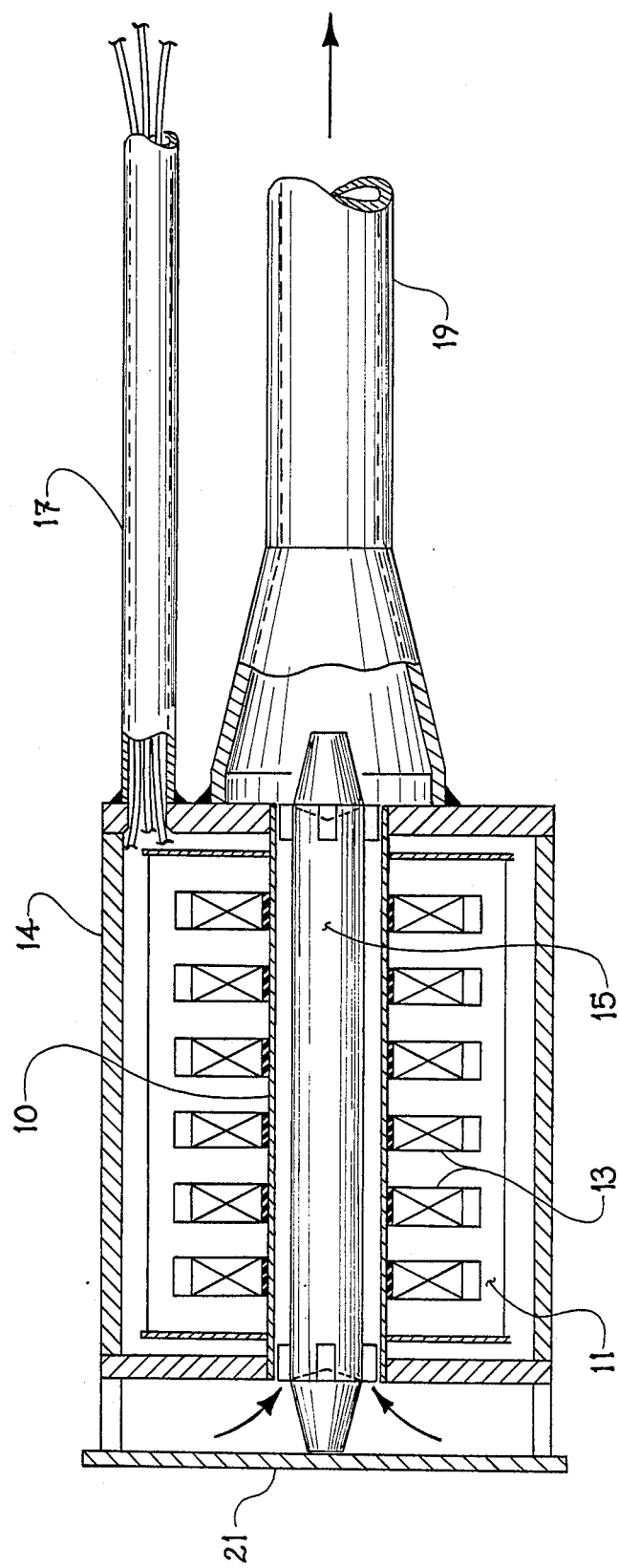
FIG. 3 shows in side cutaway elevation a preferred schematic of the pump of the present invention.
Figure 4:
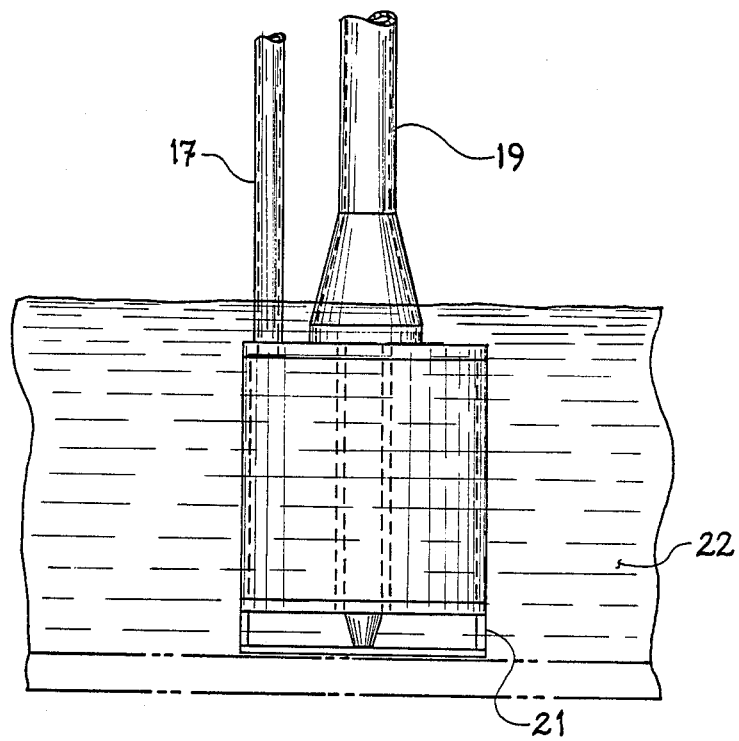
FIG. 4 shows in elevation a pump of the present invention with bail.
Figure 5:
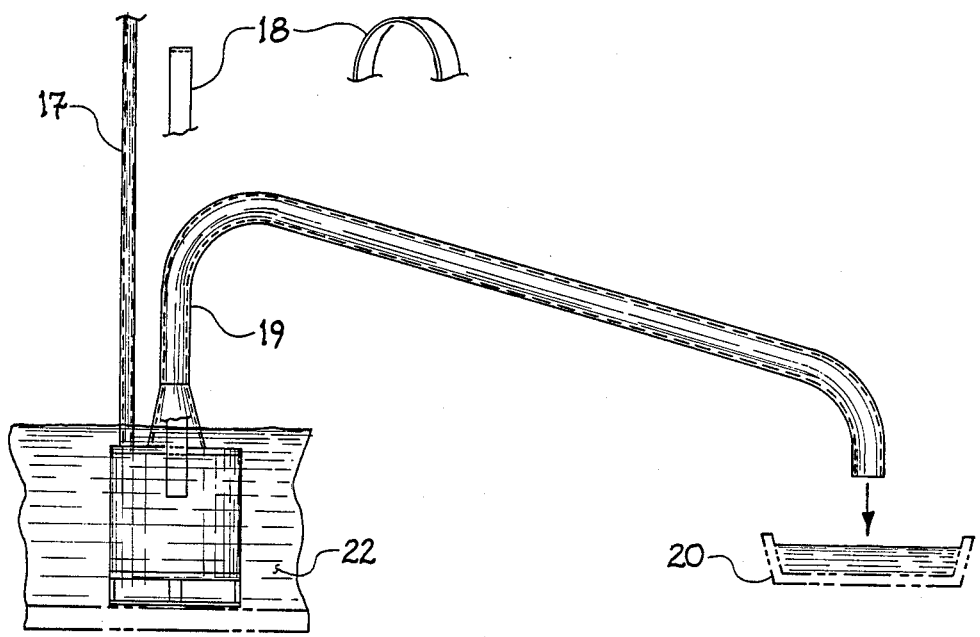
FIG. 5 shows in elevation view a preferred embodiment of application of the pump immersed in a molten metal bath contained in a vessel or melting pot with outlet tube directing the molten metal to a mold, as well as the, electrical power conduct, bail and inlet deflector.

With particular attention to FIG. 2, a preferred embodiment of the pump, there is shown an inner tube (10), also called tubular member, through which the molten metal flows when the pump is energized. Mounted about its periphery, in this version, are six laminated cores (11) which constitute the electromagnetic file generating unit of the pump and are constructed of conventional multi-fingered laminae, commonly referred to as fingered laminae, the finger ends extended towards the inner tube (10). The several laminae in an electromagnetic unit are separated one from the other and insulated from each other by a heat treated mica (12) of the present invention. Within each space between the fingers of the laminated core (11) are a number of flat deoxygenated copper coils (13) wound about the inner tube (10). While other than flat shape coil material may be used it is preferred to employ the flat design. The fingered laminate and its coils are the means for generating an electromagnetic filed across the central tube and thus are referred to as the electromagnetic member, unit or element of pumps of this kind. The laminated core (11) and its windings (13) are covered by an outer case, housing of exterior shell (14) which is sealed to the inner tube (10). Located within the inner tube (10) and centrally positioned therein is a cobalt alloy core rod (15), also referred to as a core member. Optionally and as shown the laminated core members (11) may be insulated from the inner tube 10 by heat treated mica (16). The remainder of the Figures illustrate exterior configuration of the preferred pump design to more fully appreciate the relative size of the pump, electrical conductors (17), bail (18), piping (19) from the pump to the mold (20) and a preferred deflector (21) at the intake to limit, when immersed into the molten metal bath (22), in for example a magnesium cell, the intake of slag and/or flux. This pump operated several times longer than the pump as originally purchased from the manufacturer when subjected to the same service, but failed due to fracture of an external connection.

A second purchased 12 coil pump failed on test before being placed in service. Two holes were drilled in the stator housing and air swept through the housing while the pump was heating to about 500° C. for about 16 hours. Testing showed the insulation was improved to the point no leakage was observed on electrical heat stress test and the pump was resealed and placed in service. The pump failed due to fracture of the power lead insulators. The pump was reworked as aforedescribed on the preceding example, using the heat treated mica, cobalt alloy core rod and deoxygenated copper winding and finally failed when the coils broke and short-circuited due to operator error during preheat prior to use.

Conventional molten metal handling pumps, exemplified by those built by MHD Pump and Generators;

were designed to operate in a low temperature closed loop systems. These pumps were not restricted by size and thus a twelve coil pump became the standard. When these pumps were tried for industrial molten metal handling, e.g. magnesium, the electrochemical cell size and configuration dictated that the pump be introduced to operate in the metal versus sludge and salt zones in a horizontal fashion. This created certain problems and required an elbow which restricted freedom on insertion. In addition the pump laying on its side was capable of drawing metal only to a distance from the bottom of the cell equal to ½ its diameter plus ½ the central tube diameter (the central tube annulus must be full of metal else the pump would not operate). In a magnesium cell for example any flux, salt bath or sludge accumulation entering the annulus would break the metal annulus and the pump would cease to operate. Therefore, it was deemed essential to employ a vertical pump position. Thus, the six coil pump as hereafter described was built.

The preferred orientation of the pump duct tube is in the vertical direction, so as to attain a self priming and salt draining advantage upon placement into service and pump removal, respectively, as well as to provide a lower suction inlet. In industrial metal handling applications there arose the situation that the depth of molten magnesium was less than a foot and a twelve coil pump, whose housing was over twenty inches in length if used in the vertical orientation was too tall. A six coil version of the pump in a housing less than nine inches tall was fabricated for operation with a vertically orientated duct tube. Operation tests unexpectedly revealed a performance slightly superior to the twelve coil version, while extending the application of these pumps to shallow draft holding furnaces and to small melting pots common to most die casting operations. A further embodiment to this small pump housing are suction inlet modifications that permitted low velocity inlet flows concentrated in the horizontal plane so as not to disturb or draw from a sludge accumulation that typically exists beneath molten magnesium. This embodiment is illustrated in FIGS. 2-6 of the drawings.

The discovery that conventional commercially produced amber mica, as well as mica from other sources, can be treated by heating in an oxidizing atmosphere to remove impurities to yield an electrical insulating material which exhibits superior performance in high temperature applications, higher than 700° C. (Ca 1300° F.) for extended periods of time in, for example, electromagnetic molten metal pumps without cooling as is conventional in such metal pumps, permits the design of a more compact pump as well as providing the longer in-service life in high temperature applications. Such a discovery has extensive utility in other electrical equipment which is subjected to high temperature and where external cooling is not advantageous.

It is to be understood that the pump can be operated at power supply voltage frequency other than 60 hertz. Thus, one can operate at 45, 30, 20, 10 hertz and the like with greater efficiency of pumping action for a given annulus, or the annulus volume (thus pump capacity) may be changed by employing for example in an existing pump a smaller diameter core rod and obtain greater throughput with less loss than one would obtain using 60 hertz. It is also to be understood that variable frequency controls can be used to obtain the lower frequencies in existing pumps and (or used in conjunction with the power supply control (rheostats) to control capacity of the existing pump.

We claim;

1. An electromagnetic pump submersible into molten metal and having no external cooling means, suitable for use in conveying high melting temperature molten metals having inducible electromagnetic properties which comprises a non-magnetic central tube, a core rod within said tube and said tube having arranged radially about its external surfaces a series of electromagnetic flux generating members each being comprised of an assembly of a multiplicity fingered laminae separated one from the other by a mica consisting essentially of mica selected from the group of both naturally occurring amber mica and/or synthetic mica which has been heated to above about 500° C. (932° F.) in the presence of an oxidizing gas for from 1 to 24 hours until substantially free of sooty formation visible when heated to 500° C. (932° F.) in the presence of an argon atmosphere, and assembled into a single member, said each assembly having wound between each pair of the fingers of said laminae and about said central tube an electric current carrying flat copper coil which is likewise insulated between turns with said mica; a housing enclosing said laminae and windings and sealed to said central tube, said components being operatively functional as a pump while submerged in the molten metal without external cooling.

2. An electromagnetic pump submersible into molten metals and having no external cooling means, suitable for use in conveying molten magnesium metal having inducible electromagnetic properties which comprises a non-magnetic central tube, a core rod within said tube and said tube having arranged radially about its external surfaces a series of elements capable of generating an electromagnetic field across the inner tube, each being comprised of a multiplicity of fingered laminates separated one from the other by mica and assembled into a single member, said each single member having wound within and between each pair of fingers and about the inner tube an electric current carrying flat copper coil which is likewise insulated with said mica between turns, and a housing enclosing said laminates and windings and sealed to said tubular member, said mica consisting essentially of mica selected from the group of both naturally occurring amber mica and/or synthetic mica which has been heated to above about 500° C. (932° F.) in the presence of an oxidizing gas for from 1 to 24 hours until substantially free of sooty formation visible when heated to 500° C. (932° F.) in the presence of an argon atmosphere, said components being operatively functional as a pump while submerged in the molten metal without external cooling.

3. An electromagnetic pump submersible into molten metals and having no external cooling means suitable for use in conveying molten magnesium and the like metals having inducible electromagnetic properties which comprises a non-magnetic central tube, having arranged radially about its external surfaces a series of cobalt containing nickel alloy members each being comprised of a multiplicity of fingered laminates separated one from the other by a mica and assembled into a single member, said each single member being wound with an electric current carrying flat deoxygenated copper coil which is likewise insulated with said mica, said alloy member and its coil when energized provides an electromagnetic field across the central tube, an outer case sealing with said central tube said aforesaid members from the environment, said central tube having a cobalt-alloy core rod mounted within and circumferentially aligned within said non-magnetic central tube, said mica consisting essentially of mica selected from the group of both naturally occurring amber mica and/or synthetic mica which has been heated to above about 500° C. (932° F.) in the presence of an oxidizing gas for from 1 to 24 hours until 500° C. (932° F.) in an argon atmosphere, a three phase electrical current carrying wire sealably extending through said case in electrical contact with said copper coils, and wherein said coils and electromagnetic members combine into six coils alternately connected to the three phases of said wires said components being operatively functional as a pump while submerged in the molten metal without external cooling.

* * * * *